United States Patent
Kopelman et al.

(10) Patent No.: US 7,774,234 B1
(45) Date of Patent: Aug. 10, 2010

(54) METHOD AND APPARATUS FOR OPTIMIZING SELLER SELECTION IN A MULTI-SELLER ENVIRONMENT

(75) Inventors: Joshua M. Kopelman, Wynnewood, PA (US); Srinivas Balijepalli, Devon, PA (US)

(73) Assignee: Half.com, Inc., San Jose, CA (US)

( * ) Notice: Subject to any disclaimer, the term of this patent is extended or adjusted under 35 U.S.C. 154(b) by 680 days.

(21) Appl. No.: 09/428,150

(22) Filed: Oct. 27, 1999

(51) Int. Cl.
*G06Q 30/00* (2006.01)

(52) U.S. Cl. .............................. 705/26; 705/27; 705/37

(58) Field of Classification Search ................... 705/26, 705/27, 37
See application file for complete search history.

(56) References Cited

U.S. PATENT DOCUMENTS

| | | | | |
|---|---|---|---|---|
| 4,613,946 A | * | 9/1986 | Forman | 345/853 |
| 4,799,156 A | * | 1/1989 | Shavit et al. | 705/26 |
| 5,592,375 A | * | 1/1997 | Salmon et al. | 705/7 |
| 5,664,111 A | | 9/1997 | Nahan et al. | |
| 5,715,402 A | * | 2/1998 | Popolo | 705/37 |
| 5,732,400 A | | 3/1998 | Mandler et al. | |
| 5,790,790 A | | 8/1998 | Smith et al. | 395/200.36 |
| 5,797,127 A | | 8/1998 | Walker et al. | 705/5 |
| 5,845,265 A | * | 12/1998 | Woolston | 705/37 |
| 5,950,172 A | * | 9/1999 | Klingman | 705/26 |
| 5,950,178 A | * | 9/1999 | Borgato | 705/37 |
| 5,960,411 A | | 9/1999 | Hartman et al. | |
| 6,012,045 A | | 1/2000 | Barzilai et al. | |
| 6,016,504 A | | 1/2000 | Arnold et al. | |
| 6,029,141 A | | 2/2000 | Bezos et al. | |
| 6,047,264 A | | 4/2000 | Fisher et al. | 705/26 |
| 6,061,448 A | | 5/2000 | Smith et al. | 380/21 |
| 6,076,070 A | | 6/2000 | Stack | 705/20 |
| 6,085,176 A | | 7/2000 | Woolston | 705/37 |
| 6,119,137 A | | 9/2000 | Smith et al. | 707/523 |

(Continued)

FOREIGN PATENT DOCUMENTS

WO     WO 99/07121     11/1999

(Continued)

OTHER PUBLICATIONS

Storefront Development Corporation, at Mothers' Online Thrift Shop (http://www.motshop.com) (excerpts printed Jun. 17, 2000-Jun. 19, 2000).

(Continued)

*Primary Examiner*—M. Thein
(74) *Attorney, Agent, or Firm*—Schwegman, Lundberg & Woessner, P.A.

(57) ABSTRACT

A method for selecting a seller in a multi-seller environment in which multiple sellers are offering for sale one or more goods desired by the buyer. A criterion for selecting a seller may be specified by the buyer or an intermediary. After identifying a seller offering the desired good(s) for sale, a seller is selected which best satisfies the criterion. More than one criterion may be specified. If the buyer desires to purchase multiple goods, a seller offering one or more of the multiple goods may be selected or a seller solution including a combination of sellers may be selected. A computer-implemented method and an apparatus for carrying out the computer-implemented method is also provided.

49 Claims, 4 Drawing Sheets

U.S. PATENT DOCUMENTS

| | | | |
|---|---|---|---|
| 6,178,408 B1 | 1/2001 | Copple et al. | 705/14 |
| 6,192,407 B1 | 2/2001 | Smith et al. | 709/229 |
| 6,202,051 B1 | 3/2001 | Woolston | 705/27 |
| 6,243,691 B1 | 6/2001 | Fisher et al. | 705/37 |
| 6,415,269 B1 | 7/2002 | Dinwoodie | 705/87 |
| 6,598,026 B1 * | 7/2003 | Ojha et al. | 705/26 |
| 7,302,429 B1 * | 11/2007 | Wanker | 707/7 |

OTHER PUBLICATIONS

Excerpt of document titled "Method for Buying and Selling Merchandise in a Network of Users", a document alleged to have been filed as a patent application around Jun. 1999.

mySimon: Where to Buy, muSimon Consumer Electronics, [online], [retrieved on Jun. 24, 2002] Retrieved from the Internet at <URL: http://www.mysimon.com./isrch/index.jhtml?c=tvs&pgid=shop &Input Keyword=KV-20FV300&_ttag=ksrch. (2 pp.).

* cited by examiner

METHOD AND APPARATUS FOR OPTIMIZING SELLER SELECTION IN A MULTI-SELLER ENVIRONMENT

FIELD OF THE INVENTION

This invention relates generally to the field of sales of goods and particularly to a method and apparatus for optimizing selection of a seller of a good in an environment in which multiple sellers offer the same or comparable goods for sale, particularly in electronic commerce applications using communications networks.

BACKGROUND OF THE INVENTION

The industrial age has given rise to a global economy of factories engaged in mass production of various goods. An enormous amount of commerce is transacted in the buying and selling of such goods. While some such goods lose their value with use, e.g., food products, many such goods retain a substantial portion of their value even after use or ownership by another. Such goods are referred to herein as "durable". A considerable amount of commerce is transacted in the buying and selling of durable goods.

Almost all durable goods are readily identifiable by a standard unique identification code ("ID code"), such as a Universal Product Code (UPC), particularly those that are mass produced. Some goods may have more than one type of ID code although any one of them is sufficient to uniquely identify the good.

Many durable and readily identifiable goods are fungible items that derive their value substantially from their common characteristics. For example, a single signed copy of Michael Jackson's album titled "Thriller" and recorded on a compact disc ("CD") derives much of its value because it is signed by the performance artist. Such a CD is unique and therefore is not a fungible good. In contrast, an unsigned copy of Michael Jackson's "Thriller" CD derives substantially all of its value because of the songs recorded thereon. Therefore, all such CD's have substantially the same value to consumers. Such CD's are therefore fungible. Some goods are quasi-fungible. For example, a certain book may be considered fungible in that all such books contains certain text. However, the fact that some such books may be in better condition than others means that the books may be considered quasi-fungible.

In a retail sales environment a single seller offers goods for sale to a buyer in a marketplace, e.g., the seller's store. Such a store is a single seller environment. In an auction environment, numerous sellers present goods for sale in a single marketplace but it is unlikely that multiple sellers would offer the same goods. In addition, a traditional auction format includes presentation for sale of a single good of a single seller at any one time. Traditionally, the buyer has been presented with, at most, multiple single seller environments, e.g., a shopping mall, and the buyer has selected a seller. In other words, these environments are single seller environments because only one seller is involved at the time the buyer is expressing interest in purchasing a good.

A known multi-seller environment involves a marketeer for presenting goods of others for sale. Like an auctioneer, the marketeer presents goods for sale in a marketplace under his control. The seller or a buyer may set a price. For example, a marketeer may have a website presenting for sale goods of individual retail sellers. A buyer may search for a single good and be presented with a list of sellers. The buyer may then select a seller. One such example may be found on the world wide web at www.mysimon.com, the website of mySimon Inc. of Santa Clara, Calif. The marketeer's marketplace is a multi-seller environment because multiple sellers are available to the buyer to complete the sale.

Until now, there has been no acceptable way to select a seller from a multiple seller environment where multiple sellers are available to the buyer.

Accordingly, it is an object of the present invention to provide a method for optimizing seller selection in a multiple seller environment.

It is another object of the present invention to provide a method for optimizing seller selection for a multiple good purchase.

It is yet a further object of the present invention to provide a computer-implemented method for optimizing seller selection.

It is yet a further object of the present invention to provide an apparatus for practicing the computer-implemented method.

SUMMARY OF THE INVENTION

The invention provides a method for selecting a seller in a multi-seller environment. In accordance with the present invention, a buyer expresses an interest in purchasing a good and a criterion is established for selecting a seller. For example, a buyer may establish the criterion. Sellers of the good are then identified and ratings of the sellers are determined to reflect the relative degrees by which the sellers satisfy the criterion. A seller is then selected as a function of the ratings. Multiple criteria may be specified, e.g. condition of the good, price, transportation cost, geographical proximity, etc. The method may be computer implemented. Optionally, the buyer may be presented with one or more selected sellers.

DETAILED DESCRIPTION

Figure 1:
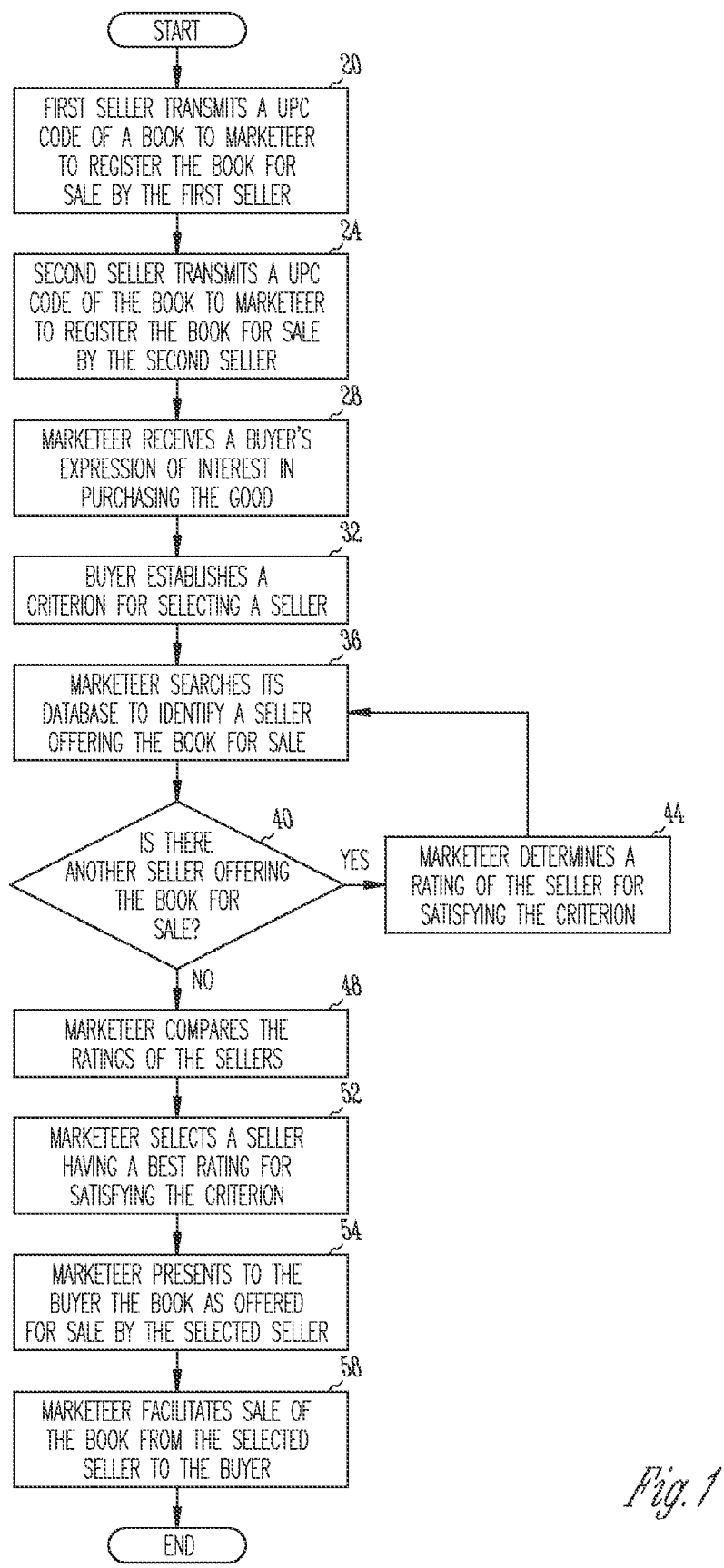
FIG. 1 is a flow diagram providing an example of a transaction in accordance with the present invention in which a buyer is interested in purchasing a single good.

The present invention provides a method and apparatus for optimizing selection of a seller in a multiple seller environment. An example of a multiple seller environment is a marketplace controlled by a marketeer for presenting goods for sale by multiple independent sellers. U.S. application Ser. No. 09/427,958 filed Oct. 27, 1999, now U.S. Pat. No. 7,373,317, the contents of which are incorporated herein by reference, describes an advantageous method and apparatus by which a marketeer may facilitate pricing and sales of goods owned by independent parties. As described in detail in U.S. application Ser. No. 09/427,958, the marketeer may, for example, maintain a website for presenting goods for sale by multiple independent sellers. The marketeer may operate a marketeer controller, which is a computer connected to a communications network. The marketeer controller stores specialized computer programs for receiving from sellers information identifying goods and for pricing the goods.

For example, a buyer visiting the marketeer's website may browse an electronic storefront of goods. Electronic storefronts and their indexing and searching capabilities are well known in the art. If the buyer expresses an interest in purchasing a good, for example a used copy of Sue Grafton's book titled "A is for Alibi", the marketeer determines whether an independent seller has registered that book for sale with the marketeer. In one embodiment, the marketeer controller determines another vendor's price for a comparable good, for example, a new copy of the book, and derives a sale price of the used copy from the other vendor's price for the new copy. The marketeer then presents to the buyer the book for sale by the seller at the sale price. For example, if a vendor is selling a new copy of the book for $10 at the time of the buyer's inquiry, the buyer may be given the opportunity to purchase a used copy of the book for $5 using the marketeer's website to identify a seller of the used book. If the buyer indicates that he wants to buy the book at the sale price, the marketeer facilitates sale of the good from the seller to the buyer. This may be achieved, for example, by identifying the seller to the buyer and the buyer to the seller so that they may perform the sale transaction. The present invention may advantageously be combined with the teachings of U.S. application Ser. No. 09/427,958.

In accordance with the present invention, a method and apparatus is provided for optimizing selection of a seller in such a multiple seller environment. In many circumstances, a buyer's desire to purchase a good could be satisfied by completing the sale with any one of many sellers offering the good for sale, particularly when the good is fungible. The seller is selected to satisfy a criterion or criteria (collectively, "criterion"). The criterion could be established by the buyer or by an intermediary, such as the marketeer. By way of example, the invention will be discussed below in the context of sale of a copy of a paperback book. This example assumes that the marketeer operates a website for presenting goods for sale and that the buyer establishes a criterion for selecting a seller as a lowest combined price for the book and shipping of the book to the buyer. This example also assumes that all books are fungible, i.e., there is no distinction between new and used books or between used books, for example, to account for their condition.

Figure 3A:
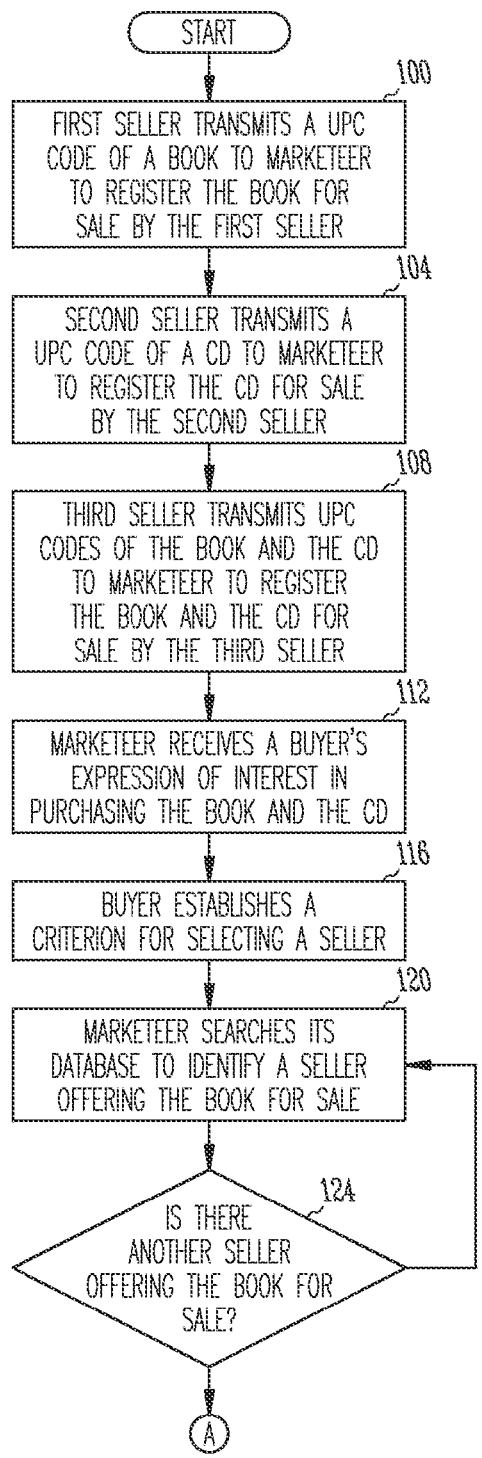
FIG. 3 is a flow diagram providing an example of a transaction in accordance with the present invention in which a buyer is interested in purchasing multiple goods.
Figure 3B:
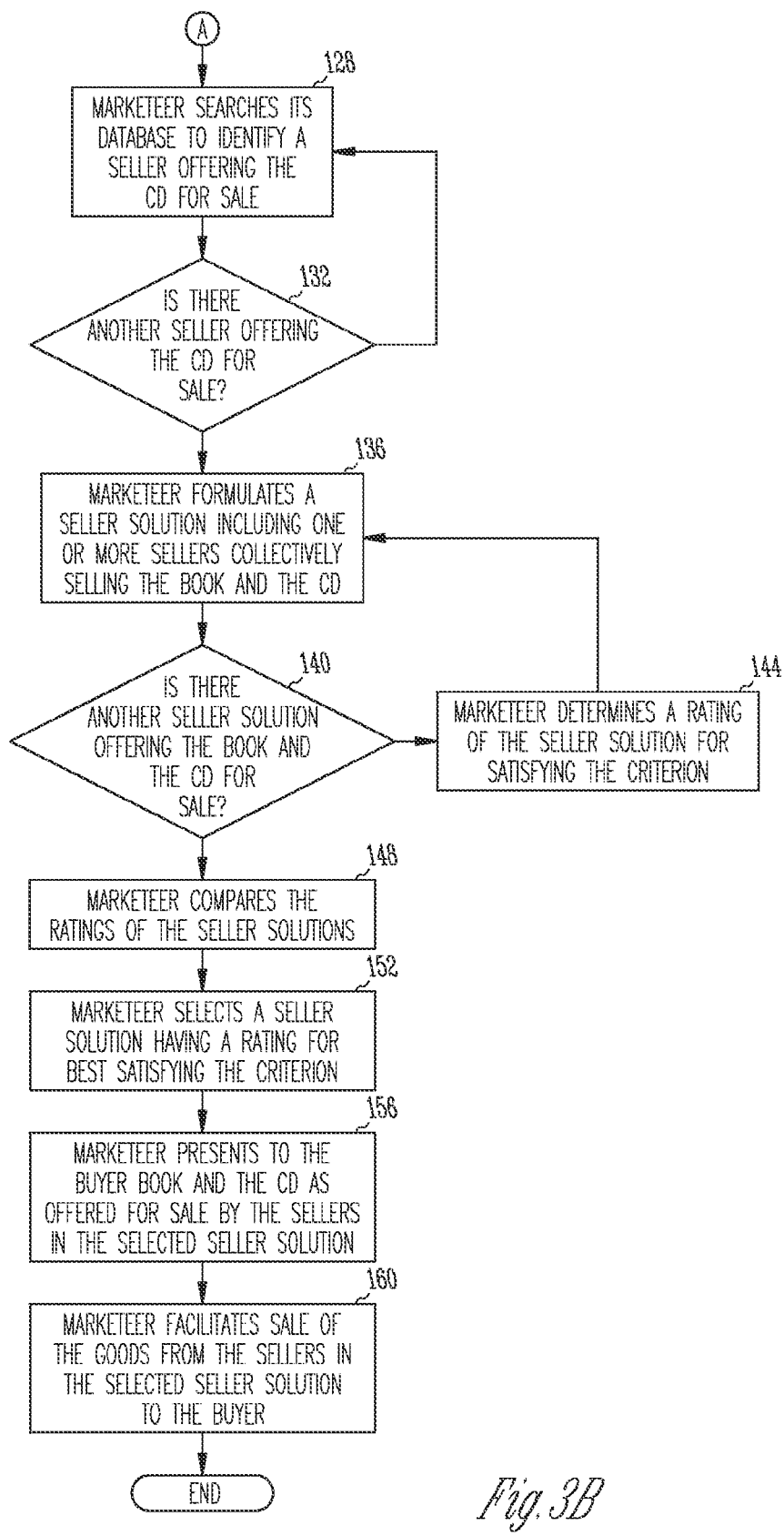

FIG. 1 is a flow diagram providing an example of a transaction in accordance with the present invention in which example of FIG. 1, a buyer is interested in purchasing a single good, namely, Sue Grafton's book titled "A is for Alibi". FIG. 3 provides an example of a transaction in accordance with the present invention in which the buyer is interested in purchasing multiple goods, e.g., Sue Grafton's book titled "A is for Alibi" ("book") and Michael Jackson's "Thriller" CD.

In the example of FIG. 1, buyers and sellers use their home computers to browse and interact with the marketeer's website via the Internet. Software, including web server and web browser software, for doing so is well known in the art. As shown in the example of FIG. 1, a marketeer first receives information from a first seller desiring to offer Sue Grafton's book for sale, as shown at step 20. The first seller can identify the book to the marketeer by inputting a standard identification code such as an International Standard Book under ("ISBN") or Universal Product Code (UPC) into an electronic form displayed on a video monitor of the seller's computer by the marketeer. As described in detail in U.S. application Ser. No. 09/427,958, the marketeer stores data identifying the book and the identify of the first seller. Optionally the buyer may enter additional information, e.g., information describing the condition of the book. This registers the book with the marketeer for sale by the first seller.

A second seller then transmits the ISBN, UPC or other code of Sue Grafton's book titled "A is for Alibi" to register the second seller's copy of the book with the marketeer for sale by the second seller, as shown at step 24. The second seller may also be asked to enter additional information, e.g., information describing the condition of the book. At this point, the book is registered with the marketeer for sale by both the first seller and the second seller. Since the books are considered fungible goods, a buyer wishing to purchase a copy of Sue Grafton's book titled "A is for Alibi" would be satisfied with the copy of the book sold by either the first seller or the second seller. However, using one seller rather than the other may better satisfy a buyer for reasons discussed further below. The present invention provides for selection of a seller to best satisfy the buyer.

A buyer then browses the marketeer's website using his computer to communicate via the Internet, as is well known in the art. In this example, the marketeer has a database of information relating to all books published by all publishers. Accordingly, the buyer is able to browse goods that have never been or are not currently registered for sale by a seller. The buyer may search by title, author, genre, etc. and once the buyer selects a good, he expresses his interest in the good, for example, by selecting an image of the cover of the book. Assuming the buyer is interested in Sue Grafton's book titled "A is for Alibi", the marketeer receives the buyer's expression of interest in purchasing the book, as shown at step 28.

A criterion is established for selecting a seller. In this example, the buyer establishes the criterion for selecting a seller, as shown at step 32. This may be achieved, for example, by selecting a criterion from a menu or clicking a checkbox associated with a criterion. A criterion may include several factors, for example, a lowest combined price including a sale price of the book and a cost to transport the book to the buyer.

The marketeer then identifies sellers offering the book for sale as shown at step 36. In this computer-implemented example, this may be performed by a marketeer controller having software for checking a UPC code associated with the book desired by the buyer against a database of UPC codes of goods registered for sale by various sellers and stored on the marketeer controller. Methods and software for matching a request to a database of records are well known in the art. In this example, the marketeer would identify the first seller in step 36. The marketeer then determines whether there are any other sellers offering the book for sale and continues searching the database to identify other sellers of the book, as shown at steps 40 and 36.

If there is another seller of the book, the marketeer determines a rating of the first seller for satisfying the criterion, as shown at step 44. In other words, the marketeer determines a rating assuming that the buyer were to purchase the book from the first seller. In this example, the criterion established by the buyer in step 32 is a lowest combined price including the sale price of the good and the cost of shipping a package to the buyer. The rating in this example is the combined price. This example assumes that the first and second sellers are selling the book for $9, and $10, respectively and that the cost of shipping the book to the buyer from the first seller is $5 and the cost of shipping the book to the buyer from the second seller is $3. Accordingly, the ratings established in step 44 are $14 for the first seller and $13 for the second seller.

If no other seller is offering the book for sale, the marketeer compares the ratings of sellers identified in step 36, as shown at step 48. In this example, the first seller's rating of $14 is compared to the second seller's rating of $13 in step 48. The marketeer then selects a seller having a best rating for best satisfying the criterion, as shown at step 52. Since the criterion is a lowest combined price, the second seller's rating of $13 best satisfies the criterion and the second seller is selected in step 52.

The marketeer then presents to the buyer the book as offered for sale by the second seller, as shown at step 54. For example, the buyer may be presented with a combined price for the good and shipping of $13. Optionally, the buyer may be presented with information that the good is also for sale for $14. If the buyer chooses to purchase the book at $13, the marketeer facilitates sale of the good from the second seller to the buyer, as shown at step 58. This could be achieved, for example, by identifying the buyer to the second seller and the second seller to the buyer so that the buyer and the second seller can complete the sale transaction.

Figure 2:
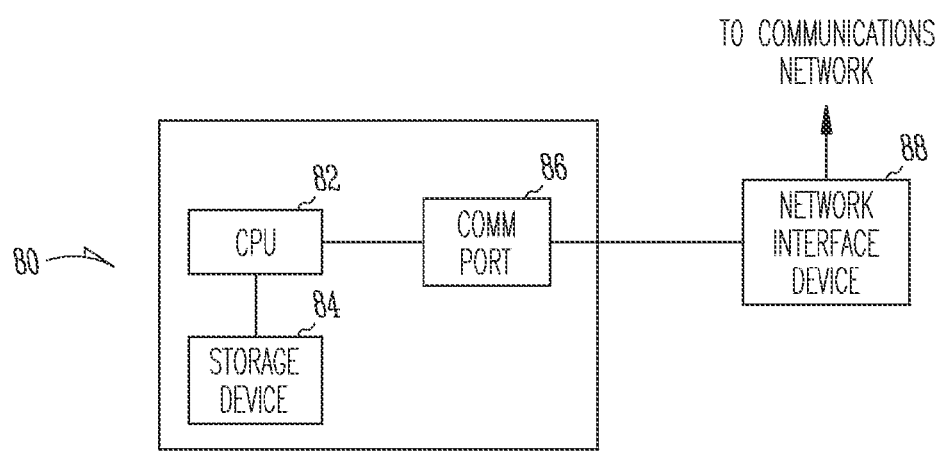
FIG. 2 is a block diagram of an optimization controller in accordance with the present invention.

In this example, the method is computer-implemented and the marketeer selects a seller using an optimization controller. A block diagram of an optimization controller for implementing the method is shown in FIG. 2. The optimization controller 80 has a clocked central processing unit (CPU) 82 for executing computer programs. The optimization controller also includes a memory or "storage device" 84 for storing at least some of the programs that are to be executed by the CPU. The storage device 84 may include a read only memory ("ROM"), a random access memory ("RAM") and/or a hard disk drive for storage of data. Use of a clocked CPU in conjunction with a storage device is well known in the art of CPU-based electronic circuit design.

The optimization controller also includes a communication port ("COMM PORT") 86 which enables the CPU to communicate with devices external to the controller, e.g., a network interface device 88. In this manner, information received via the network interface device 88 can be processed by the CPU and the CPU can send information to the communications network via the network interface device 88. In this example, the network interface device 90 includes a modem. The optimization controller is configured for communication with a buyer interface, e.g., a buyer's computer running standard web browser software, as is well known in the art.

The optimization controller stores in its memory a first program for receiving data indicating a buyer's desire to purchase a good, a second program for identifying a group of sellers offering the good for sale, a third program for determining a rating of each seller of the group of sellers for satisfying a criterion, and a fourth program for selecting a seller as a function of the ratings. In this example, the optimization controller also stores in its memory a fifth program for receiving data from the buyer. The controller also stores a sixth program for presenting to the buyer a price for the good for sale by the seller selected by the fourth program. The price could be a sale price for the good or a price which best satisfies the criterion; for example, a combined price including both a sale price of the good and shipping costs. The controller also stores a seventh program for facilitating sale of the good from the seller selected by the fourth program to the buyer.

FIG. 3 is a flow diagram providing an example of a transaction in accordance with the present invention in which the buyer is interested in purchasing multiple goods, namely, Sue Grafton's book titled "A is for Alibi" ("book") and Michael Jackson's "Thriller" CD. As in FIG. 1, the marketeer controls a website for offering independent sellers' goods for sale. In this example, it is assumed that the marketeer performs a computer-implemented version of the inventive method for selecting a seller in a multi-seller environment.

As shown in the example of FIG. 3, a first seller registers the book for sale with the marketeer by transmitting a UPC code identifying the book, as shown at step 100. A second seller registers the CD for sale with the marketeer by transmitting a UPC code identifying the CD, as shown at step 104. Also, it is assumed that a third seller transmits UPC codes for the book and the CD to the marketeer to register the book and the CD for sale by the third seller, as shown at step 108. At this point, the book is registered with the marketeer for sale by both the first seller and the third seller and the CD is registered with the marketeer for sale by both the second seller and the third seller.

A buyer then browses the marketeer's website and selects goods he wishes to buy. In this example, the marketeer receives an expression of a buyer's interest in purchasing the book and the CD, as shown at step 112. Since more than one seller is offering each good for sale, the marketeer could facilitate sales of the book and the CD to the buyer in several ways. In other words, the marketeer could match either the first seller or the third seller with the buyer for sale of the book and either the second seller or the third seller with the buyer for sale of the CD. A seller or combination of sellers ("seller solution") must be selected. In accordance with the present invention, a seller solution is selected which best satisfies a criterion. In this example, the buyer specifies the criterion for selecting a seller, as shown at step 116 and discussed above.

The marketeer searches a database of goods registered for sale to identify sellers of the desired book and CD. In this example, the marketeer (through use of the optimization controller) first searches the database for sellers of the book, as shown at steps 120 and 124. In the example, the first and third sellers are identified as sellers of the book. The marketeer then searches its database to identify sellers offering the CD for sale, as shown at steps 128 and 132. In the example, the second and third sellers are identified as sellers of the CD.

Once the marketeer has identified sellers of the goods, the marketeer formulates seller solutions for satisfying the buyer's desire to purchase the book and the CD, as shown at steps 136 and 140. The marketeer preferably formulates as many seller solutions as possible. Additionally, the marketeer determines a rating of each seller solution for satisfying the criterion set by the buyer, as shown in step 144. In the example, the marketeer would formulate a first seller solution including the first seller for sale of the book and the second seller for sale of the CD. The marketeer would also formulate a second seller solution including the first seller for sale of the book and the third seller for sale of the CD, a third seller solution including the third seller for sale of the book and the second seller for sale of the CD, and a fourth combination including the third seller for sale of both the book and the CD.

For this example, it is assumed that the criterion is a lowest combined price for the book, the CD and shipping to the buyer. It is also assumed, for simplification, that shipping of a single package of any number of goods costs $3. However, shipping costs may vary with size, weight, shipping distance, etc. and may be determined for a particular package to be shipped. The first seller is selling the book for $7, the second seller is selling the CD for $9 and that the third seller is selling the book for $8 and the CD for $10. It is further assumed, for simplification, that the rating is a combined price for the book, the CD and the shipping of the book and the CD to the buyer. The criterion and rating need not be measured in identical units. For example, in another embodiment in which the criterion is quick delivery or condition of a good, the rating could be, for example, geographical distance between the seller (in miles) or a rating from 1-5.

Accordingly, the rating for the first seller solution is $22 ($7+$3+$9+$3), the rating for the second seller solution is $23 ($7+$3+$10+$3), the rating for the third seller solution is $23 ($8+$3+$9+$3), and the rating for the fourth seller solution is $21 ($8+$10+$3). The marketeer compares these ratings in step 148 and selects a seller solution having a rating for best satisfying the criterion, as shown in step 152. Since the criterion is a lowest combined price, the fourth seller solution is selected in step 152. In this example, although the third seller is more expensive than the first and second sellers for the book and the CD, the fourth seller solution best satisfies the criterion. This is because the difference in price for the goods is outweighed by the savings in shipping costs. In other words, the buyer gets a savings in total cost by paying for shipping from only one seller, rather than from two sellers, by selecting a seller offering multiple goods for sale.

The marketeer then presents the book and the CD for sale by the selected seller solution, i.e., the fourth seller solution, as shown at steps 156. If the buyer chooses to purchase the book and CD, the marketeer facilitates sale of the goods from the fourth seller solution (third seller) to the buyer, as shown at step 160.

To select a seller solution for multiple-good inquiries, in which a buyer expresses interest in purchasing multiple goods in a single transaction or communications session, the optimization controller stores additional programs and/or the programs are further configured. Accordingly, the optimization controller may also store in its memory an eighth program for formulating a combination of sellers offering multiple goods for sale. To handle multiple good inquiries, the first program is further configured to receive data indicating a buyer's desire to purchase multiple goods. Additionally, the second program is further configured to identify a seller solution including a combination of one or more sellers collectively offering the multiple goods for sale. In other words, the second program searches not only for a single seller offering the multiple goods for sale but also considers combinations of sellers collectively offering the multiple goods for sale. For example, a seller solution may be considered in which a first seller is offering a first good for sale (e.g., a book) and a second seller is offering a second good for sale (e.g., a CD).

Additionally, the third program is further configured to determine a rating of each combination of sellers (seller solution) for satisfying the criterion, and the fourth program is further configured to select a seller or a seller solution as a function of the ratings. In other words, the third program provides a rating for sellers and seller solutions and the fourth program considers both sellers and seller solutions and picks the seller or seller solution which best meets the criterion.

It should be appreciated that the invention also applies to more complex transactions than those provided above by way of example. For example, the method is easily extensible to handle numerous sellers, goods, and numerous seller combinations. In addition, multiple criteria or a single criterion including multiple criteria may be specified for example, lowest price and best condition. In one embodiment, the buyer may specify a weighting or relative importance of the several factors.

Various criteria may be specified. In one embodiment, goods could be considered quasi-fungible goods. For example, paperback books could be considered quasi-fungible because they all contain the same text although they may be in various degrees of condition. In such an embodiment, each seller may rate the condition of his book as "excellent", "good", "fair", or "poor" and the buyer may specify that he wishes to purchase a book in particular condition, e.g., "good" condition.

In another embodiment, the criterion could be a lowest price for the good or a lowest cost to ship the good. The cost could be calculated in various ways, e.g., by determining the distance between the seller's address and the buyer's address and/or by consulting a commercial shipper to determine shipping costs. In another embodiment, a criterion could be selection of a seller from whom the buyer has previously purchased a good or a seller having a minimum specified reliability rating. For example, the marketeer could track buyer/seller transactions and assign reliability ratings to reflect feedback received from buyers. One example of such a rating could be a five-star scale, five stars indicating the highest degree of seller reliability for satisfactorily completing the sale transaction. In another embodiment, the criterion could be a combination of the above-identified and/or other criteria. Although in the preferred embodiment the buyer specifies the criterion, in an alternate embodiment, the marketeer or another party could specify the criterion.

Additionally, it should be appreciated that many different types of ratings could be used. For example, the rating could be a score on an arbitrary scale or simply a ranking. Although it is preferred that the marketeer present the buyer only with the best seller or combination of sellers, in an alternate embodiment, a list of sellers or seller solutions could be presented to the buyer and the buyer could make the final selection.

It should also be noted that the buyer may express his interest in any suitable manner, e.g., inputting a standard identification code or a description into an electronic form displayed on the buyer's video monitor by the marketeer, or selecting a hyperlink associated with the good, and appearing to the buyer as an image or text. It should also be appreciated that a marketeer may facilitate a sale in alternate ways, for example, referring the parties to a clearinghouse or escrow agent or acting as a clearinghouse and to manage the sale, e.g., by accepting credit card payments.

If the buyer wishes to purchase three or more goods, a seller solution may include one or more sellers of multiple goods and one or more sellers of only one good. If a selected seller solution includes more than one seller, the marketeer may identify the first seller to the buyer and/or the buyer to the first seller for sale of the first good and may further identify the second seller to the buyer and/or the buyer to the second seller for sale of the second good.

Additionally, it should be appreciated that the optimization controller could have numerous configurations. For example, in other embodiments, the network interface device could include a network card, a hard-wired connection, radio communication equipment, optical communication equipment, or similar equipment and could be internal to the optimization controller.

U.S. application Ser. No. 09/428,078, filed Oct. 27, 1999, now abandoned, the contents of which are incorporated herein by reference, describes an advantageous method and apparatus for promoting resale of goods, including resale by a marketeer. In general, the method includes soliciting an agreement from a buyer of a good to offer the good for resale at a future time. Since a marketeer earns revenue when he facilitates a sale, the method gives the marketeer an opportunity to double revenues by facilitating two sales. Particularly, in the example of Sue Grafton's book titled "A is for Alibi", the marketeer facilitates a first sale of the book from a seller to a first buyer and, if the first buyer agrees to resell the book, the marketeer has the opportunity to facilitate a second sale of the same copy of "A is for Alibi" from the first buyer to a second buyer. The method may be computer-implemented. The present invention may advantageously be combined with the teachings of U.S. application Ser. No. 09/428,078.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention.

Accordingly, the foregoing description is by way of example only, and not limiting. The invention is limited only as defined in the following claims and equivalents thereto.

What is claimed is:

1. A computer-implemented method for selecting a preferred seller from a group of independent sellers in a multiple seller environment, each seller of the group of sellers offering a good for sale that is fungible or quasi-fungible with respect to the goods of the other sellers of the group of sellers, the method comprising:
    receiving, at a computer, an expression of a buyer's interest in purchasing the good;
    searching, by computer in an automated fashion, a database to identify goods for sale having certain buyer-searchable characteristics, the identified goods collectively being offered for sale by the group of sellers, each seller of the group of sellers having listed its good for sale within the multiple seller environment;
    establishing at least one criterion for selecting a seller from the group of sellers, a first criterion of the at least one criterion being that the seller offer a second good that the buyer has previously expressed an interest in buying;
    identifying, by computer in an automated fashion, a first seller of the group of sellers;
    identifying, by computer in an automated fashion, a second seller of the group of sellers;
    determining, by computer in an automated fashion, a rating of the first seller for satisfying the first criterion;
    determining, by computer in an automated fashion, a rating of the second seller for satisfying the first criterion; and
    selecting, by computer in an automated fashion, a preferred seller as a function of the ratings, the preferred seller being selected in an automated manner from among the first and second sellers, the preferred seller being selected as the respective seller having a best respective rating for satisfying the first criterion;
    wherein the identifying, determining and selecting steps are performed after the searching step, and
    wherein the at least one criterion comprises multiple criteria, each of the multiple criteria having a specified relative importance to be used in determining the ratings; and
    facilitating sale of the good from the preferred seller to the buyer.

2. The method of claim 1, wherein the buyer establishes the at least one criterion.

3. The method of claim 2, wherein the at least one criterion is a condition of the good.

4. The method of claim 2, wherein the buyer establishes the criterion by selecting the criterion from a menu of selectable criteria.

5. The method of claim 4, wherein said rating quantifies a respective seller's relative degree of satisfaction of the criterion.

6. The method of claim 5, wherein each rating is quantified in numerical form.

7. The method of claim 1, wherein a second criterion of the at least one criterion is established by a marketeer, the marketeer presenting for sale goods of independent sellers, each seller of the group of sellers having listed its good for sale with the marketeer.

8. The method of claim 1, wherein a second criterion of the at least one criterion is a lowest price for the good.

9. The method of claim 1, wherein a second criterion of the at least one criterion is a lowest cost to transport the good to the buyer.

10. The method of claim 9, wherein the lowest cost to transport the good is determined by as a function of a geographical distance between the buyer and the sellers.

11. The method of claim 1, wherein a second criterion of the at least one criterion is a lowest combined price including a sale price of the good and a cost to transport the good from the seller to the buyer.

12. The method of claim 1, wherein a second criterion of the at least one criterion is selection of a seller from which the buyer has previously purchased a good.

13. The method of claim 1, wherein a second criterion of the at least one criterion is selection of a seller having a specified seller reliability rating.

14. The method of claim 13, wherein the specified seller reliability rating is specified by the buyer.

15. The method of claim 1, further comprising presenting to the buyer the good offered for sale by the preferred seller.

16. The method of claim 15, further comprising presenting to the buyer goods offered for sale by other sellers, the goods being presented in an order corresponding to the sellers' respective ratings.

17. The method of claim 16, further comprising presenting a sale price for the good to the buyer.

18. The method of claim 14, further comprising facilitating sale of the good from the preferred seller to the buyer.

19. The method of claim 1, further comprising presenting to the buyer the preferred seller as the only seller offering the good for sale.

20. The method of claim 1, wherein each of the ratings comprises a metric that is independent of prices of the goods.

21. The method of claim 1, wherein each of the ratings comprises a metric that is no more than partially dependent upon prices of the goods.

22. The method of claim 1, wherein each of the ratings reflects a relative degree of partial satisfaction of the criterion by a corresponding seller.

23. The method of claim 22, wherein said rating quantifies a respective seller's relative degree of satisfaction of the criterion.

24. The method of claim 1, further comprising presenting to the buyer only the first good offered for sale by the preferred seller.

25. The method of claim 1, wherein the criterion for selecting a seller from the group of sellers is different from the buyer searchable characteristics used to search a database to identify goods for sale.

26. The method of claim 1, wherein the criterion for selecting a seller from the group of sellers comprises a standard involving a characteristic of a seller.

27. The method of claim 1, wherein each rating is a numerical value.

28. The method of claim 1, wherein each of the ratings reflects a degree to which a corresponding seller satisfies the criterion, the rating being expressed as a point within a range of a scale.

29. The method of claim 1, wherein each of the ratings reflects a degree to which a corresponding seller satisfies the criterion, the rating being expressed as a score on an arbitrary scale.

30. The method of claim 1, wherein each of the ratings reflects a degree to which a corresponding seller satisfies the criterion, the rating being expressed as a ranking 31. The method of claim 1, wherein the criterion relates to a particular seller's ability to provide quick delivery of a purchased good.

32. The method of claim 1, wherein each of the ratings reflects a geographical distance between the seller and the buyer.

33. The method of claim 1, wherein each of the ratings is expressed in dollar units.

34. A method for selecting a preferred seller from among independent sellers in a multiple seller environment, the independent sellers offering goods for sale, the method being computer-implemented to be carried out in an automated fashion, the method comprising:

receiving, at a computer, an expression of a buyer's interest in purchasing a first good having certain characteristics that may be used to search a computer database of different goods;

searching, by computer in an automated fashion, the computer database to identify a plurality of goods for sale, each of the plurality of goods having the certain characteristics, each of the identified goods being offered for sale by a respective independent seller, the respective independent sellers collectively forming a group of sellers, each seller of the group of sellers offering the first good for sale that has the certain characteristics, each seller of the group of sellers having listed its good for sale within the multiple seller environment;

determining, by computer in an automated fashion, a first rating for a first seller of the group of sellers, the first rating reflecting a relative degree to which the first seller satisfies at least one criterion for selecting a seller from the group of sellers offering fungible or quasi-fungible goods for sale, the at least one criterion for selecting a seller being distinct from the certain characteristics used for the searching to identify goods, a first criterion of the at least one criterion being that the seller offer a second good that the buyer has previously expressed an interest in buying;

determining, by computer in an automated fashion, a second rating for a second seller of the group of sellers, the second rating reflecting a relative degree to which the second seller satisfies the first criterion;

selecting, by computer in an automated fashion, a preferred seller as a function of the ratings, the preferred seller being selected from among the first and second sellers, wherein said ratings quantify a respective seller's relative degree of satisfaction of the at least one criterion; and facilitating sale of the first good and the second good from the preferred seller to the buyer.

35. The method of claim 34, wherein the determining and selecting steps are performed after the searching step.

36. The method of claim 34, further comprising presenting to the buyer the first good offered for sale by the preferred seller.

37. The method of claim 36, further comprising presenting to the buyer the preferred seller as the only seller offering the first good for sale.

38. The method of claim 34, further comprising presenting to the buyer goods offered for sale by other sellers, the goods being presented in an order corresponding to the sellers' respective ratings.

39. The method of claim 38, further comprising presenting a sale price for the first good to the buyer.

40. The method of claim 34, wherein the criterion for selecting a seller from the group of sellers is different from the buyer searchable characteristics used to search a database to identify goods for sale.

41. The method of claim 34, wherein the criterion for selecting a seller from the group of sellers comprises a standard involving a characteristic of a seller.

42. A method for selecting a preferred seller from among independent sellers in a multiple seller environment, the independent sellers offering goods for sale, the method being computer-implemented to be carried out in an automated fashion, the method comprising:

receiving, at a computer, an expression of a buyer's interest in purchasing a first good having certain characteristics that may be used to search a computer database of different goods;

searching, by computer in an automated fashion, the computer database to identify a plurality of goods for sale, each of the plurality of goods having the certain characteristics, each of the identified goods being offered for sale by a respective independent seller, the respective independent sellers collectively forming a group of sellers, each seller of the group of sellers offering a good for sale that has the certain characteristics, each seller of the group of sellers having listed its good for sale within the multiple seller environment;

determining, by computer in an automated fashion, a first rating for a first seller of the group of sellers, the first rating quantifying a relative degree to which the first seller satisfies a criterion for selecting a seller from the group of sellers offering fungible or quasi-fungible goods for sale, the criterion for selecting a seller being a standard involving a characteristic of a seller and being distinct from the certain characteristics used for the searching to identify goods, the criterion being that the seller offer a second good that the buyer has previously expressed an interest in buying;

determining, by computer in an automated fashion, a second rating for a second seller of the group of sellers, the second rating quantifying a relative degree to which the second seller satisfies the criterion;

selecting, by computer in an automated fashion, a preferred seller as a function of the ratings, the preferred seller being selected from among the first and second sellers; and facilitating sale of the first good and the second good from the preferred seller to the buyer.

43. A computer-implemented method for selecting a preferred seller from a group of independent sellers in a multiple seller environment, the method comprising:

receiving, at a computer, an expression of a buyer's interest in purchasing a first good;

searching, by computer in an automated fashion, a database to identify goods for sale having certain buyer-searchable characteristics, the identified goods collectively being offered for sale by the group of sellers, each seller of the group of sellers having listed its good for sale within the multiple seller environment;

establishing at least one criterion for selecting a seller from the group of sellers, the criterion including a standard involving application of logic to at least one fact and being that the seller offer a second good that the buyer has previously expressed an interest in buying;

identifying, by computer in an automated fashion, a first seller of the group of sellers;

identifying, by computer in an automated fashion, a second seller of the group of sellers;

determining, by computer in an automated fashion, a rating of the first seller for satisfying the criterion, the first seller's rating reflecting a relative degree to which a first fact relating to proposed purchase of the first good from the first seller meets the standard;

determining, by computer in an automated fashion, a rating of the second seller for satisfying the criterion, the second seller's rating reflecting a relative degree to which a second fact relating to proposed purchase of the first good from the second seller meets the standard, wherein said ratings quantify a respective seller's relative degree of satisfaction of the criterion;

selecting a preferred seller as a function of the ratings, the preferred seller being selected in an automated manner from among the first and second sellers;

wherein the identifying, determining and selecting steps are performed after the searching step; and facilitating sale of the first good and the second good from the preferred seller to the buyer.

44. A method for selecting a preferred seller from among independent sellers in a multiple seller environment, the method comprising:

receiving, at a computer, an expression of a buyer's interest in purchasing a first good having certain characteristics;

searching, by computer in an automated fashion, the computer database to identify a plurality of goods having the certain characteristics, each of the identified goods being offered for sale by a respective independent seller, the respective independent sellers collectively forming a group of different sellers, each seller of the group of different sellers having listed its identified good for sale within the multiple seller environment;

determining, by computer in an automated fashion, a first rating for a first seller of the group of sellers, the first rating reflecting a relative degree to which the first seller satisfies a criterion that the seller offer a second good that the buyer has previously expressed an interest in buying;

determining, by computer in an automated fashion, a second rating for a second seller of the group of sellers, the second rating reflecting a relative degree to which the second seller satisfies the criterion, wherein each of the first and second ratings comprises a seller reliability rating; and facilitating sale of the identified good and the second good from the first seller to the buyer.

45. The method of claim 44, further comprising:

selecting as a preferred seller, from among the different sellers of the group of sellers, a respective seller having a respective rating for satisfying the criterion that is better than other sellers' respective ratings for satisfying the criterion.

46. The method of claim 45, further comprising:

identifying a criterion for selecting a preferred seller from among the different sellers of the group of sellers, the criterion for selecting a seller being distinct from the certain characteristics used for the searching to identify goods.

47. The method of claim 44, further comprising:

displaying to the buyer a list of sellers, each having a respective displayed rating reflecting a relative degree to which the second seller satisfies the criterion.

48. A method for selecting a preferred seller in a multiple seller environment, the method comprising:

receiving, at a computer, an expression of a buyer's interest in purchasing a first good having certain characteristics that may be used to search a computer database of different goods;

searching, by computer in an automated fashion, the computer database to identify goods having the certain characteristics, each of the goods being offered for sale by a respective independent seller, the respective independent sellers collectively forming a group of different sellers, each seller of the group of different sellers having listed its identified good for sale within the multiple seller environment; and selecting a preferred seller from among the group of different sellers, said selecting comprising:

identifying a criterion for selecting a seller from the among the group of different sellers, the criterion being distinct from the certain characteristics used for the searching to identify goods, and being that the seller offer a second good that the buyer has previously expressed an interest in buying;

determining, by computer in an automated fashion, a respective rating for each seller of the group of sellers, each rating reflecting a relative degree to which the respective seller satisfies the criterion;

wherein the preferred seller is selected as a particular seller having a respective rating indicating a greater degree of satisfaction of the criterion than another seller, wherein each of the respective ratings comprises a seller reliability rating; and facilitating sale of the identified good and the second good from the preferred seller to the buyer.

49. The method of claim 48, wherein a prospective purchase from each respective seller has a respective certain trait, and the criterion defines a standard for evaluation of the prospective purchase from each respective seller as a function of the respective certain trait, results of the evaluation being expressed in the respective rating.

* * * * *

UNITED STATES PATENT AND TRADEMARK OFFICE
CERTIFICATE OF CORRECTION

| | | |
|---|---|---|
| PATENT NO. | : 7,774,234 B1 | Page 1 of 1 |
| APPLICATION NO. | : 09/428150 | |
| DATED | : August 10, 2010 | |
| INVENTOR(S) | : Joshua Kopelman et al. | |

It is certified that error appears in the above-identified patent and that said Letters Patent is hereby corrected as shown below:

Title page 2, in column 2, under "Other Publication", line 4, delete "muSimon" and insert -- mySimon --, therefor.

In column 3, line 62, delete "identify" and insert -- identity --, therefor.

In column 10, line 28, in Claim 18, delete "claim 14," and insert -- claim 17, --, therefor.

In column 10, line 67, in Claim 30, delete "ranking" and insert -- ranking. --, therefor.

In column 14, lines 27-28, in Claim 48, delete "the among the group" and insert -- among the group --, therefor.

Signed and Sealed this

Twelfth Day of October, 2010

David J. Kappos
*Director of the United States Patent and Trademark Office*